(12) United States Patent
McQueen (10) Patent No.: US 9,501,677 B2
(45) Date of Patent: Nov. 22, 2016

(54) DATA ENTRY DEVICE WITH ENHANCED AIMING

(71) Applicant: DATALOGIC ADC, INC., Eugene, OR (US)

(72) Inventor: Alexander M. McQueen, Eugene, OR (US)

(73) Assignee: Datalogic ADC, Inc., Eugene, OR (US)

(*) Notice: Subject to any disclaimer, the term of this patent is extended or adjusted under 35 U.S.C. 154(b) by 0 days.

(21) Appl. No.: 14/462,088

(22) Filed: Aug. 18, 2014

(65) Prior Publication Data

US 2016/0048715 A1    Feb. 18, 2016

(51) Int. Cl.
  *G06K 7/10* (2006.01)
(52) U.S. Cl.
  CPC ....... *G06K 7/10831* (2013.01); *G06K 7/10722* (2013.01); *G06K 7/10861* (2013.01); *G06K 7/10871* (2013.01); *G06K 2007/10485* (2013.01); *G06K 2007/10504* (2013.01); *G06K 2007/10514* (2013.01); *G06K 2207/1011* (2013.01)
(58) Field of Classification Search
  CPC ............. G06K 7/10702; G06K 7/10861; G06K 7/10831; G06K 2207/1011; G06K 7/10881; G06K 2007/10514; G06K 2007/10504; G06K 7/10722; G06K 7/10361; G06K 2007/10485; G06K 7/10871; G02B 2027/014; G02B 2027/0138; G06F 3/011; G06F 3/012; G06F 3/013; G06F 3/0304; H04N 13/04; H04N 13/0468
  See application file for complete search history.

(56) References Cited

U.S. PATENT DOCUMENTS

| | | | |
|---|---|---|---|
| 2008/0142597 A1* | 6/2008 | Joseph | G06K 7/10722 235/462.21 |
| 2010/0163622 A1* | 7/2010 | Olmstead | 235/454 |
| 2011/0309147 A1* | 12/2011 | Barkan et al. | 235/440 |
| 2012/0113140 A1* | 5/2012 | Hilliges | G06F 3/012 345/633 |
| 2013/0048732 A1* | 2/2013 | Gregerson et al. | 235/462.14 |

* cited by examiner

*Primary Examiner* — Sonji Johnson
(74) *Attorney, Agent, or Firm* — Shook, Hardy & Bacon L.L.P.

(57) ABSTRACT

An improvement is made to a scanning device to increase item throughput at the point of sale (POS). The scanning device implements a mirror that allows a cashier to see hidden or obscured optical codes or bar codes on items. The mirror can reflect an aiming beam from a camera, which also allows the cashier to correctly scan the optical codes or bar codes. The mirror and camera can incorporate different properties to enable both the cashier and a customer to stand on opposite sides of the scanning device and scan items.

23 Claims, 8 Drawing Sheets

CASHIER SIDE
ILLUMINATION ON

CUSTOMER SIDE
ILLUMINATION ON

DATA ENTRY DEVICE WITH ENHANCED AIMING

CROSS-REFERENCE TO RELATED APPLICATIONS

Not applicable.

BACKGROUND OF THE INVENTION

It has been observed through time that one of the persistent factors which reduce point of sale (POS) item scanning throughput is the operator's inability to easily locate the optical code on a package when it is not immediately visible. In such cases, the operator may fumble for several seconds while turning the package through different rotations in an attempt to see the label so that it may then be oriented towards the scanning device. Scanners have been devised to minimize the need for package orientation, but have never completely eliminated the need for operators to view the labels as they attempt to scan the data. In most cases, the operator cannot see that their hand is partly covering the data, that the package may be folded or wrinkled in a way that obscures some of the data, or that the data is not being presented to the active scanning zone due to mis-location. All of these cases are reduced or eliminated if the operator receives additional visual feedback about the data location in addition to usual direct view information that the operator receives.

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention provide additional views of items at a scanning device by placing a reflective surface, such as a mirror, in the vicinity of the target scan zone. As the operator moves the item towards the scan zone and the mirror, the normally invisible reverse side of the item may be viewed through the mirror, giving the operator much more information about where the data may be located.

Embodiments of the present invention provide an aiming beam that allows an operator to accurately align an item in the scan zone of a scanning device. The aiming beam originates from a camera and allows the operator to visually align the aiming beam to the optical code or bar code on the item.

Embodiments of the present invention provide the capability of allowing customers to scan identification (ID) cards, cell phone displays, coupons, or other items from the side of the scanning device opposite the cashier. The cashier or operator may continue to scan items from their side of the scanning device. This two-direction scanning is accomplished by using a partially reflective coating on the mirror's surface, which allows a single camera to view both cashier-scanned and customer-scanned items. The camera sees the customer-scanned item through the mirror. In an alternative, the two-direction scanning is accomplished by splitting the scanning camera's field of view (FOV) into two parts by allowing the camera to partially "look over" the mirror. The camera can view both cashier-scanned and customer-scanned items without the use of the partially reflective coating on the mirror's surface.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention relate generally to an imaging scanner that has enhanced usability and aiming to aid an operator and another person, such as a cashier and customer. Accordingly, the present invention implements a mirror to aid the operator in seeing hidden optical codes or bar codes during scanning. The mirror can incorporate see-through capability or split visual field of view capability to allow a person standing on the other side of the imaging scanner to also scan items. Further, the present invention implements a aiming beam to allow the operator to scan the optical codes or bar codes correctly.

In a first aspect, an imaging scanner with enhanced usability and aiming is provided that includes a scanning camera positioned to receive an image of an item reflected from a mirror. The scanning camera partially shares a field of view with an operator's visual field of the mirror. The mirror is located so that the operator can locate and aim an item's data at the scanning camera. The operator has a first line of sight to the item's data reflected in the mirror and the scanning camera has a second line of sight to the items' data.

In another aspect, an imaging scanner with enhanced usability and aiming is provided that includes a scanning camera positioned to receive an image of a first item reflected from a mirror and an image of a second item transmitted through the mirror. The mirror has a partially reflecting and partially transmitting coating. The scanning camera partially shares a field of view with an operator's visual field of the mirror. The scanning camera sees a reflection in the mirror of the image of the first item positioned by the operator on a first side of the mirror. The scanning camera also sees the image of the second item through the mirror where the second item is positioned by a person on a second side of the mirror. The mirror is located so that the operator can locate the first item's data and can aim the first item's data at the scanning camera. The operator has a first line of sight to the first item's data through the reflection in the mirror and the scanning camera has a second line of sight to the first items' data. The mirror is also located so that the person can position the second item's data such that the scanning camera sees the second item's data through the mirror.

In yet another aspect, an imaging scanner with enhanced usability and aiming is provided that includes a scanning camera positioned to receive an image of a first item reflected from a mirror and to receive an image of a second item seen directly over the mirror. The scanning camera partially shares a field of view with an operator's visual field of the mirror. The scanning camera sees a reflection in the mirror of the image of the first item positioned by the operator on a first side of the mirror. The scanning camera also sees the image of a second item over the mirror where the second item is positioned by a person on a second side of the mirror. The mirror is located so that the operator can locate the first item's data and can aim the first item's data at the scanning camera. The operator has a first line of sight to the first item's data through the reflection in the mirror. The scanning camera has a second line of sight to the first item's data. The scanning camera has a third line of sight to the second item's data.

Figure 1:
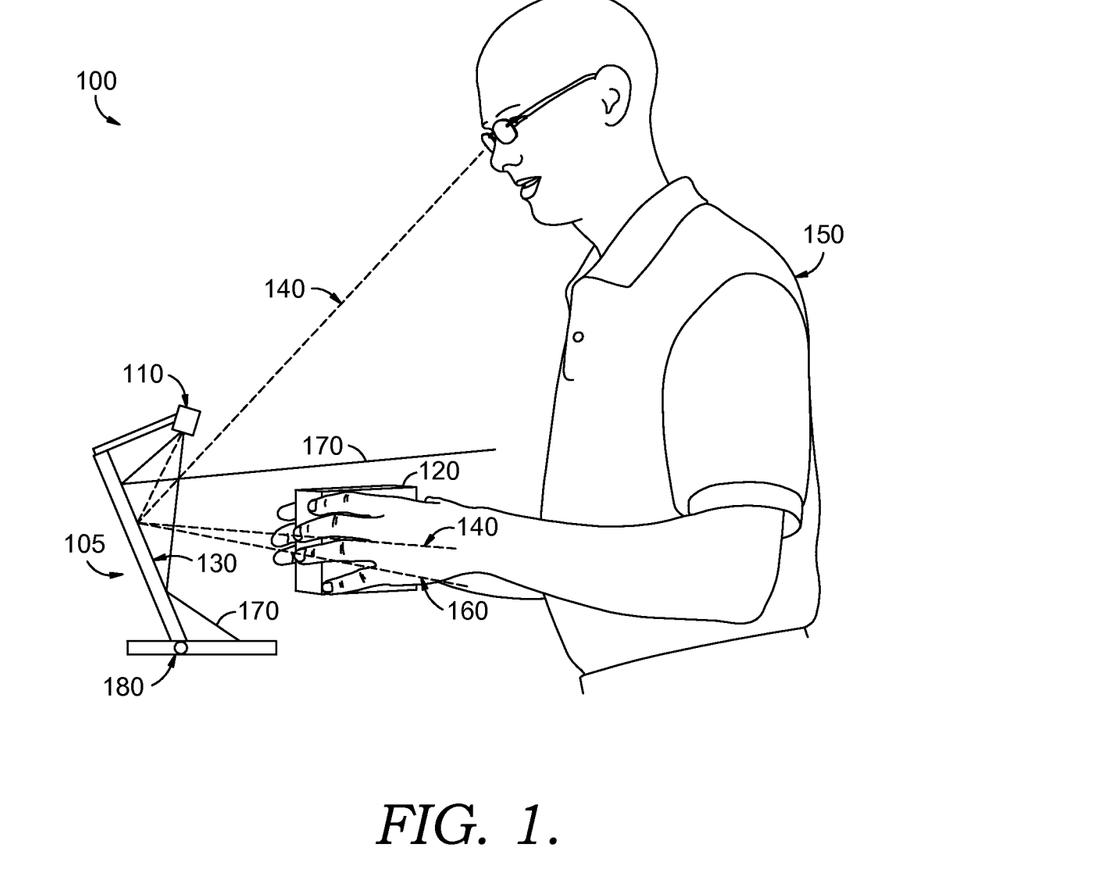
FIG. 1 is an exemplary view of a scanner with a camera and mirror for use by an operator, implemented in accordance with an embodiment of the present invention.

Implementations of an embodiment of the present invention in FIG. 1 include an imaging scanner 105 in a scanning environment 100. Imaging scanner 105 includes a camera 110, which partially shares a field of view 170 of a mirror 130 with an operator 150's visual field of view of mirror 130. Mirror 130 and camera 110 are arranged such that as an item 120 to be scanned is brought within an active scan zone, the back of item 120, normally not visible to operator 150, is seen through mirror 130. The angle of mirror 130 is adjustable by operator 150 to allow for different preferences and different physical statures. Operator 150's line of sight 140 and the scanning camera 110's line of sight 160 do not need to coincide or be coaxial. The image of item 120 reflected in mirror 130 is still useful in helping operator 150 locate an item 120's data at imaging scanner 105.

As discussed above, camera 110 can be a solid state camera or another type of camera that can capture images. More particularly, camera 110 is also referred to as a scanning camera. Camera 110 can scan or read optical codes, bar codes, or other data that are located on items or packages placed within the scan zone at imaging scanner 105.

In one embodiment, the location and angle of scanning camera 110 are fixed relative to mirror 130. This means that as mirror 130 is moved or adjusted, camera 110 maintains the same position to mirror 130. Mirror 130 can be connected to a hinged base 180, which allows the entire camera/mirror assembly to be adjusted to operator 150's preference. Mirror 130 may have optical power to enhance operator 150's view. Mirror 130 may also have several subsections at varying angles to enhance operator 150's view.

In another embodiment, the surfaces surrounding the window or windows of imaging scanner 105 may include materials that create a mirrored surface, allowing the back of item 120 to be seen therewith. In yet another embodiment, a reflective device may be affixed to the main housing of imaging scanner 105 to allow the back of item 120 to be seen.

Figure 2:
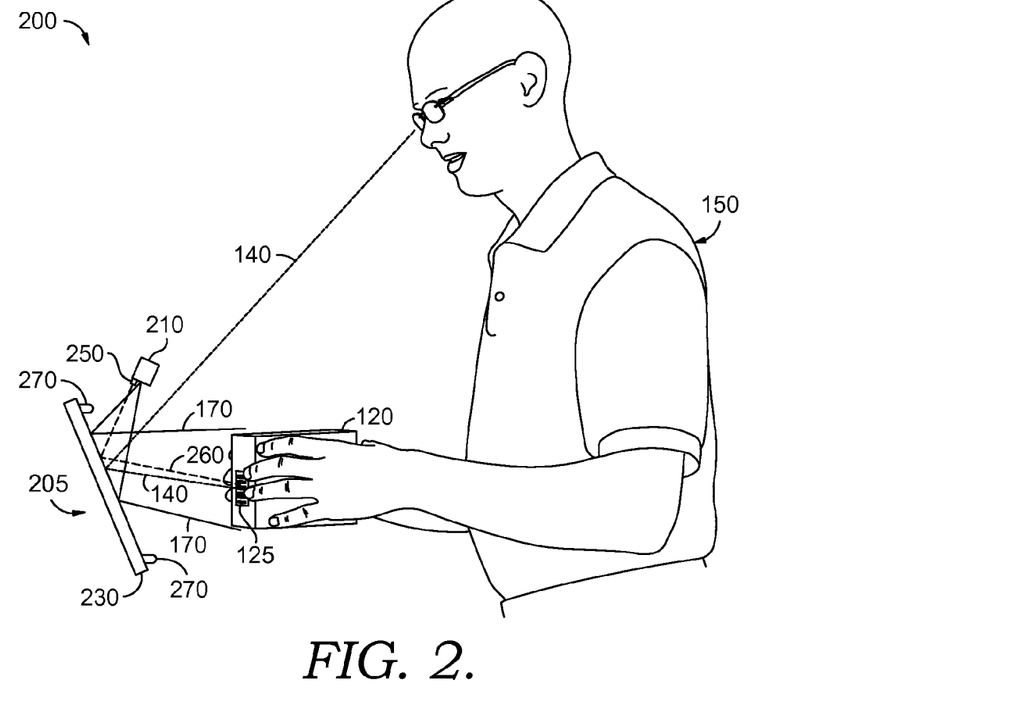
FIG. 2 is an exemplary view of a scanner with a camera, mirror, and aiming beam for use by an operator, implemented in accordance with an embodiment of the present invention.

Turning now to FIG. 2, imaging scanner 205, in scanning environment 200, uses a partially transmitting mirror 230 and sequenced lighting 270 to allow scanning camera 210 to view item 120 being presented by operator 150 to the front of the scanner or imaging scanner 205. Imaging scanner 205 includes an aiming beam 260 that originates from an aiming device 250 located on camera 210. Aiming beam 260 is visible to operator 150 and can be reflected in mirror 230. Aiming beam 260 eliminates the inherent aiming error caused by the fact that operator 150's line of sight 140 as reflected in mirror 230 is not coaxial with scanning camera 210's optical axis. Aiming beam 260 lets operator 150 align optical code 125 within the scan zone.

In continuing, FIG. 2 illustrates the features of FIG. 1 with the addition of aiming beam 260. Operator 150 attempts to scan item 120 with an optical code 125. Optical code 125 can also be a bar code or other data that can be read or scanned. Optical code 125 is located in such a way to be hidden, obscured, or facing away from operator 150. Operator 150 can see optical code 125 in mirror 230 by line of sight 140. Line of sight 140 allows operator 150 to correctly align optical code 125 within camera 210's field of view 170. Mirror 230 is attached to camera 210, although that connection is not shown in FIG. 2. As shown in FIG. 1, camera 210 views the scan volume by reflection in mirror 230.

Camera 210's field of view 170 can be seen and identifies the boundaries of what the camera can see even with the reflection. Camera 210's optical axis or line of sight 160 is between the boundaries. Because it is difficult to have operator 150's and camera 210's lines of sight coincident or coaxial, aiming device 250 generates aiming beam 260. Aiming beam 260 is aligned to be closely coincident or substantially coaxial with camera 210's optical axis or line of sight 160. In this arrangement, if aiming beam 260 is centered on optical code 125, then camera 210's view will also be centered on optical code 125. Thus, operator 150, looking through the reflection in mirror 230, can see aiming beam 260 on item 120 with optical code 125. Operator 150 can easily center optical code 125 for reading. To improve image contrast and effectively stop the motion of item 120 with respect to camera 210's exposure, lighting or strobe illuminators 270 can provide intense, brief pulses of light, which flood the surface of item 120 being scanned.

Figure 3:
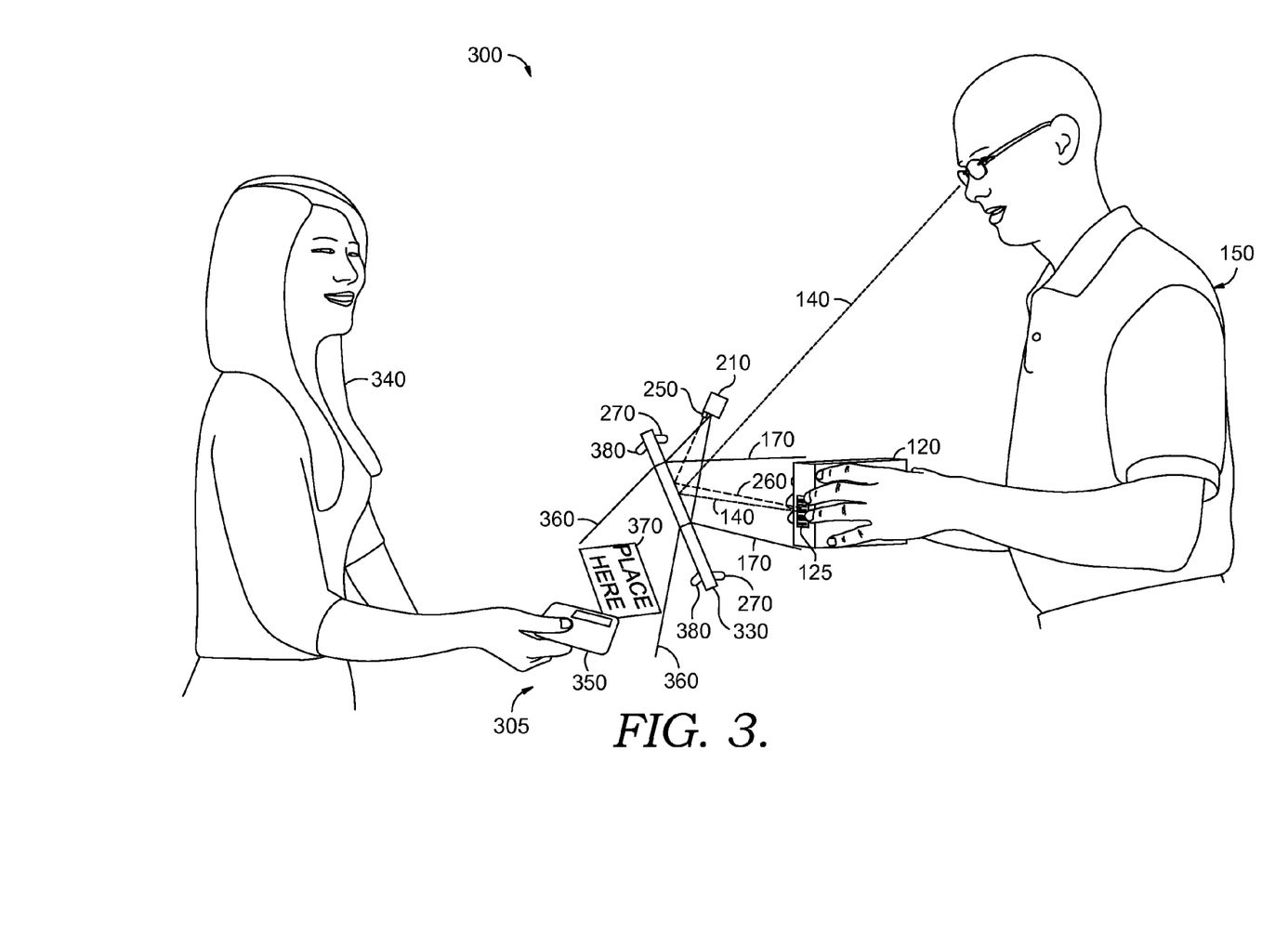
FIG. 3 is an exemplary view of a scanner with a camera and reflective and transmitting mirror for use by an operator and another person, implemented in accordance with an embodiment of the present invention.

In FIG. 3, scanning environment 300 provides an alternative embodiment to the aforementioned scanners. Many of the features shown to the side of operator 150 are the same or similar to the features described in FIGS. 1 and 2. Operator 150 may be a cashier at a store. Operator 150 scans item 120 by looking at optical code 125's reflection in mirror 330. Operator 150 is assisted by aiming beam 260. Aiming beam 260 is typically a beam of light originating from aiming device 250. The beam of light may be generated by a laser, a light-emitting diode (LED), a lamp, or other source of illumination. Camera 210 views optical code 125's reflection by observing the reflection in mirror 330.

In implementations of embodiments of the present invention, mirror 330 has a partially reflecting and partially transmitting coating, which allows items on both sides of mirror 330 to be seen by camera 210. While operator 150 can scan item 120, customer 340 can present an optical code to the scanner by placing an item 350 with the optical code, such as a driver's license, coupon, cell phone display, etc., on a delineated area 370 of the imaging scanner 305. Area 370 may be marked by a sign, plaque, or other passive indicating means, or it may be marked by illuminated patterns or other active means. The delineating means would preferably be attached to imaging scanner 305 and may be part of the stand or base.

As stated before, mirror 330 is partially transmitting. This allows camera 210 to view area 370 through mirror 330, as shown by camera 210's second field of view 360. Additional illumination (or illuminators 380) allow camera 210 to view the transmitted image with high contrast. During operation, illuminators 270 and illuminators 380 can be alternately pulsed so that the images of item 120 (reflected) and item 350 (transmitted) do not interfere with each other when captured by camera 210. Because the normal cashier-side (operator 150) scanning occurs much more frequently than the customer-side (customer 340) scanning, illuminators 270 may be pulsed several times more for each pulse of illuminators 380. Whatever the embodiment that is implemented, the frame capturing in camera 210 may be synchronized with each illumination pulse.

Figure 4:
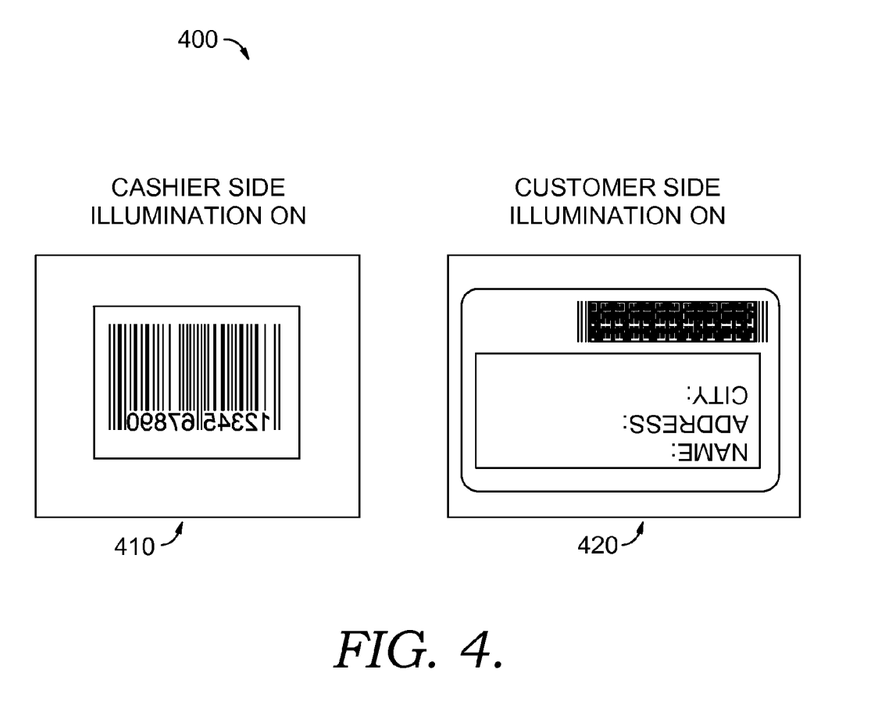
FIG. 4 is an exemplary visual representation of simultaneously scanned items when used by an operator and another person, in an implementation in accordance with an embodiment of the present invention.

Turning now to FIG. 4, scanned items 400 illustrate the output of the scanning activities of a cashier 150 and customer 340. On the cashier's side, an item 410 may be scanned and seen by camera 210. On the customer's side, an item 420 may be scanned and also seen by camera 210. It is noted that camera 210 may see both items simultaneously. However, illuminators 270 and 380 may restrict the lighting so that only one item is recorded in each camera frame. Note: Item 410 is similar to item 120 and item 420 is similar to item 350. One of ordinary skill in the art knows that strobe lighting can be used to alternate which item gets lighting and accordingly gets captured in camera 210's frame.

In some cases, a cell phone display must be scanned using the built-in backlight of the display. The sequenced lighting from illuminators 380 may not be effective in allowing the display to be read. Also, the loss of light traversing a beam splitting mirror 330 of approximately 50% transmissivity would further reduce the ability of the display to be seen by camera 210. Note: Transmissivity is a measure of the ability of a material or medium to transmit electromagnetic energy as light. Therefore, FIG. 5 discloses a scanning environment 500 that overcomes the problems of lighting.

Figure 5:
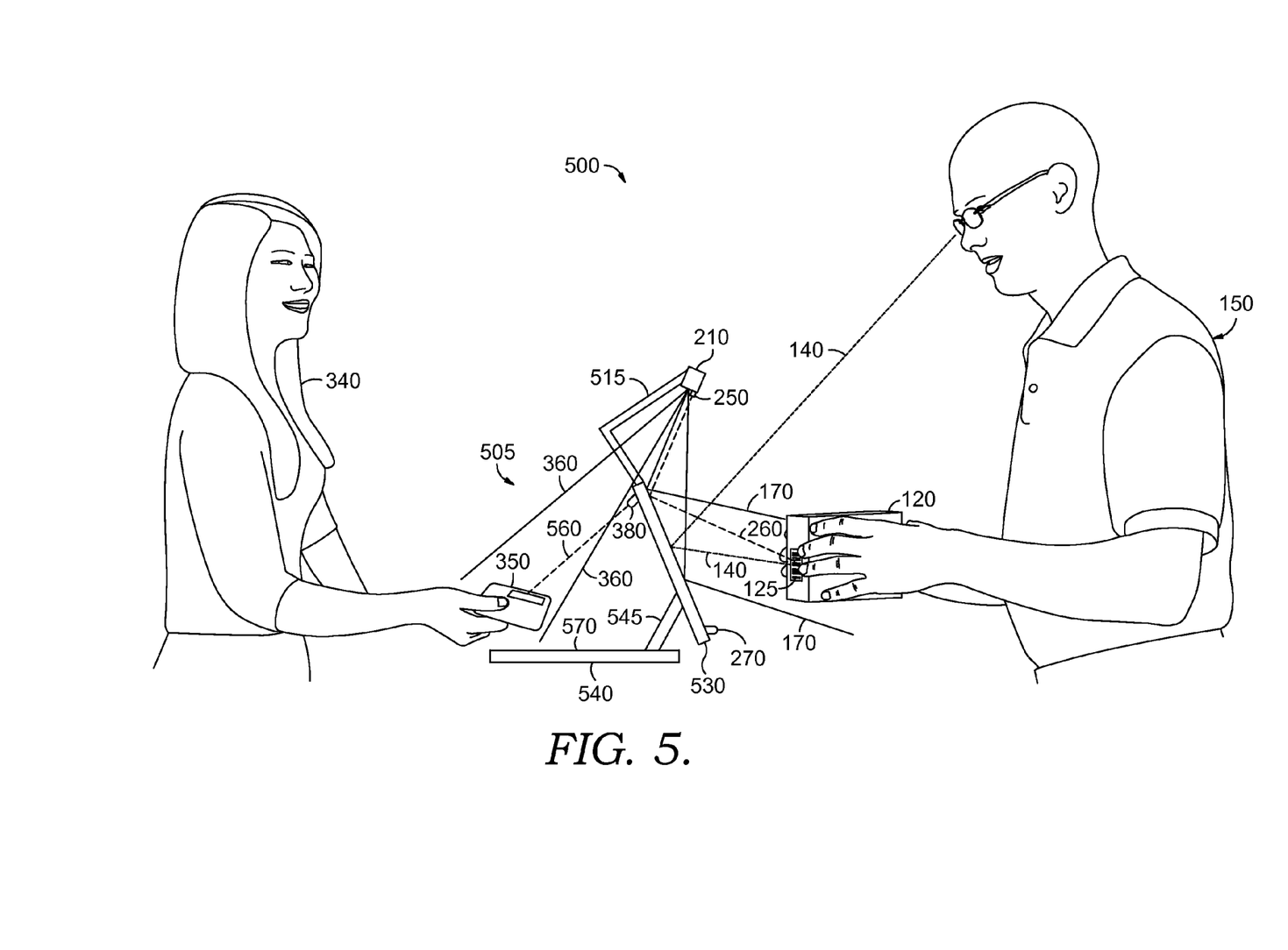
FIG. 5 is an exemplary view of a scanner with a camera with a dual field of view for use by an operator and another person, implemented in accordance with an embodiment of the present invention.

In FIG. 5, operator 150 attempts to scan optical code 125 on item 120. Operator 150 can see optical code 125 through mirror 530 by line of sight 140. Attached to mirror 530 by member 515 is scanning camera 210. A part of camera 210's field of view, delineated by partial field of view boundaries 170, views the scan volume by reflection in mirror 530. Mirror 530 is supported by a stand member 545, which is in turn attached to a base member 540. Alternatively, if mirror 530 incorporates a frame or housing around its perimeter, the frame may be directly attached to base member 540 without intervening stand member 545.

The portion of camera 210's field, which is not intercepted by mirror 530, passes over mirror 530 as shown by partial FOV boundary lines 360. Camera 210 may be oriented such that its FOV's longer dimension is substantially vertical. A sign or other indicia 570 (such as area 370) may be affixed to base member 540 to indicate where customer 340 is to place their item 350. Illuminators 270 and 380 may be sequenced on and off at the same times as discussed in FIG. 3. In addition to aiming beam 260 from aiming device 250 for use by cashier 150, customer-side illuminator 380 may include an aiming beam 560, which provides a visibly delineated area in which customer 340 can place their item 350. By having customer-side aiming beam 560, the need for a sign, plaque, or other indicia at area 370 or indicia 570 (indicating where to place the item to be scanned) is eliminated. Similar to FIG. 4, but not shown here, camera 210 can have a split field of view with the customer-side field of item 350 being captured in a frame and the cashier-side field of item 120 being captured in another frame.

Figure 6:
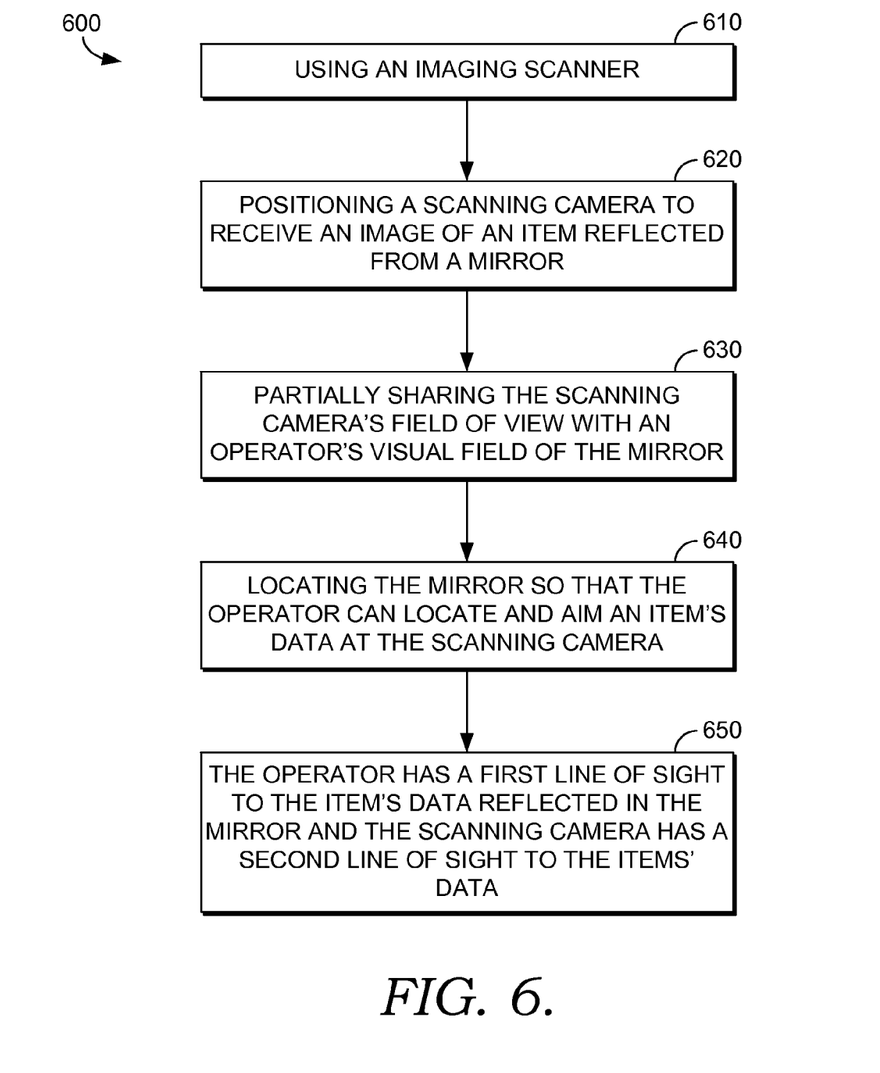
FIG. 6 is a process for using a scanner with enhanced usability and aiming in accordance with an embodiment of the present invention.

Turning now to FIG. 6, a process for using a scanner with enhanced usability and aiming is provided in a method 600. In a step 610, an imaging scanner 105 is used by an operator 150. A scanning camera 110 is positioned to receive an image of an item 120 reflected from a mirror 130, in a step 620. Scanning camera 110's field of view 170 and operator 150's visual field of mirror 130 are partially shared, in a step 630. In a step 640, mirror 130 is located so that operator 150 can locate and aim item 120's data at scanning camera 110. In a step 650, operator 150 has a first line of sight 140 to item 120's data reflected in mirror 130 and scanning camera 110 has a second line of sight 160 to item 120's data.

Figure 7:
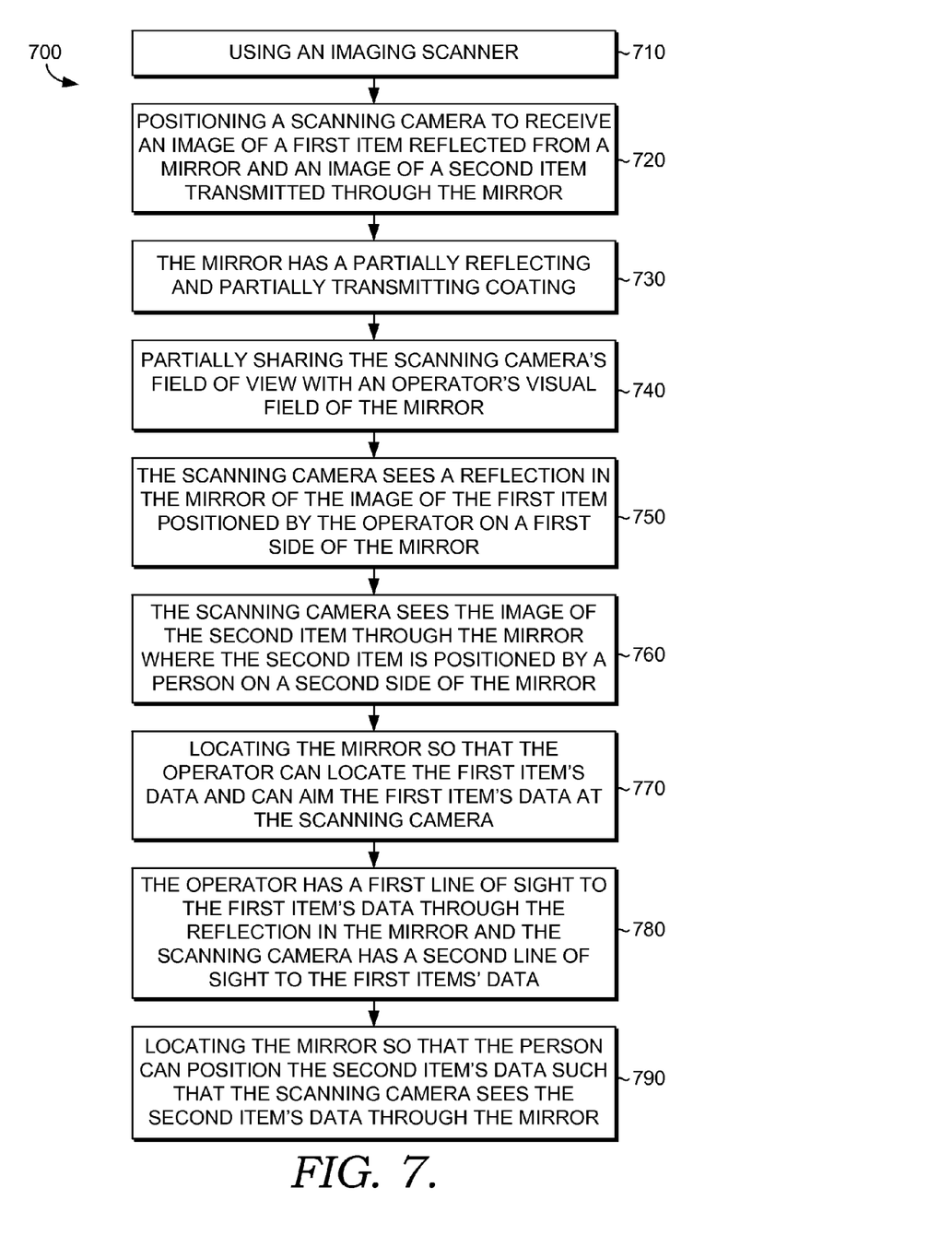
FIG. 7 is another process for using a scanner with enhanced usability and aiming in accordance with an embodiment of the present invention.

In FIG. 7, another process for using a scanner with enhanced usability and aiming is provided in a method 700. In a step 710, an imaging scanner 305 is used by operator 150. Scanning camera 210 is positioned to receive an image of a first item 120 reflected from a mirror 330, in a step 720. Scanning camera 210 is positioned to also receive an image of a second item 350 transmitted through mirror 330. Mirror 330 has a partially reflecting and partially transmitting coating, in a step 730. In a step 740, scanning camera 210's field of view 170 and operator 150's visual field of mirror 330 are partially shared. In a step 750, scanning camera 210 sees a reflection in mirror 330 of the image of the first item 120 positioned by operator 150 on a first side of mirror 330. Scanning camera 210 sees the image of the second item 350 through mirror 330 where the second item 350 is positioned by a person 340 on a second side of mirror 330, in a step 760. Mirror 330 is located so that operator 150 can locate the first item 120's data and can aim the first item 120's data at scanning camera 210, in a step 770. In a step 780, operator 150 has a first line of sight 140 to the first item 120's data through the reflection in mirror 330 and scanning camera 210 has a second line of sight 160 to the first item 120's data. Mirror 330 is located so that person 340 can position the second item 350's data such that scanning camera 210 sees the second item 350's data through mirror 330.

Figure 8:
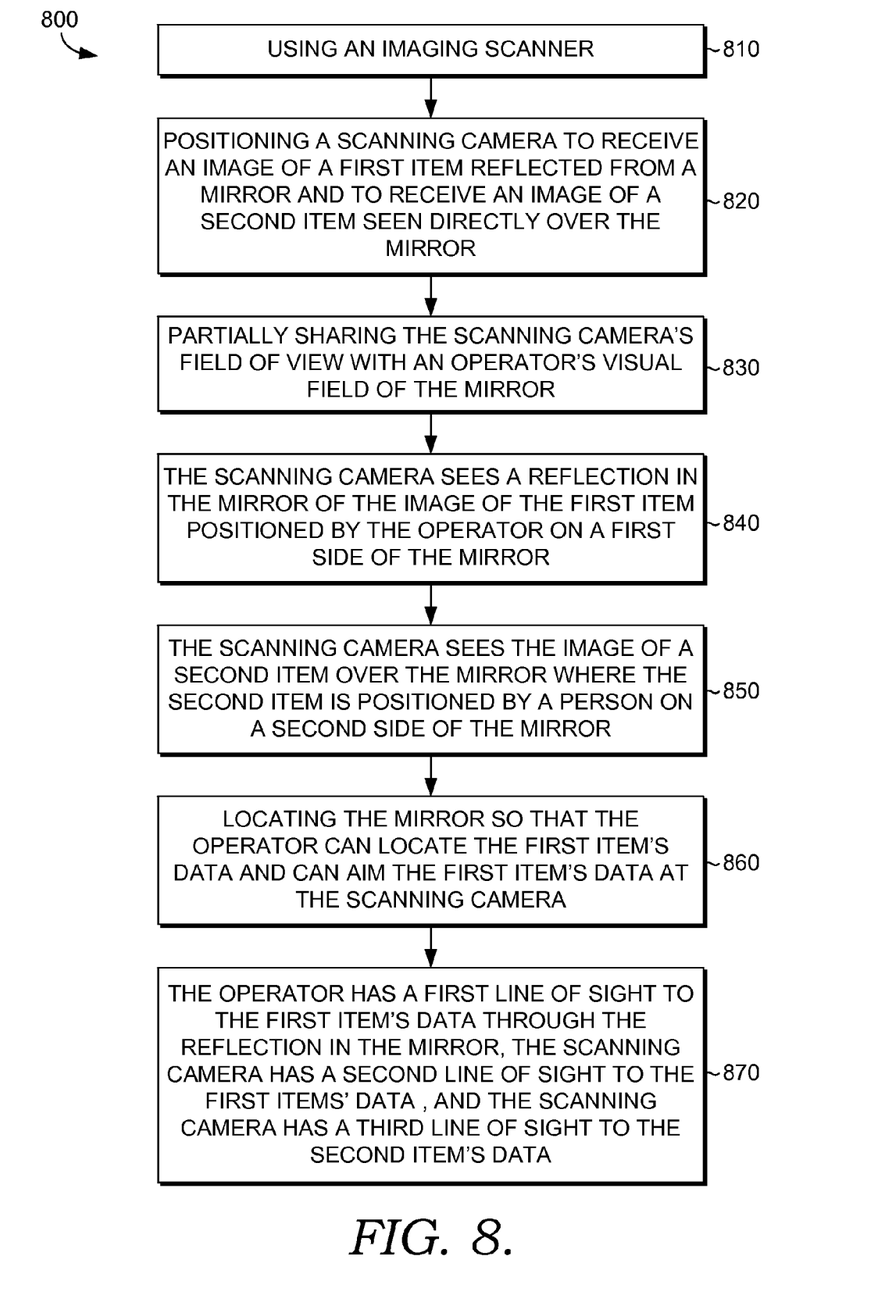
FIG. 8 is yet another process for using a scanner with enhanced usability and aiming in accordance with an embodiment of the present invention.

Turning now to FIG. 8, yet another process for using a scanner with enhanced usability and aiming is provided in a method 800. In a step 810, an imaging scanner 505 is used by operator 150. Scanning camera 210 is positioned to receive an image of a first item 120 reflected from a mirror 530, in a step 820. Scanning camera 210 is positioned to also receive an image of a second item 350 directly over mirror 530. In a step 830, scanning camera 210's field of view 170 and operator 150's visual field of mirror 530 are partially shared. In a step 840, scanning camera 210 sees a reflection in mirror 530 of the image of the first item 120 positioned by operator 150 on a first side of mirror 530. Scanning camera 210 sees the image of the second item 350 over mirror 530 where the second item 350 is positioned by a person 340 on a second side of mirror 530, in a step 850. Mirror 530 is located so that operator 150 can locate the first item 120's data (optical code 125) and can aim optical code 125 at scanning camera 210, in a step 860. In a step 870, operator 150 has a first line of sight 140 to optical code 125 through the reflection in mirror 530 and scanning camera 210 has a second line of sight 160 (also aiming beam 260) to optical code 125. Scanning camera 210 also has a third line of sight to the second item 350's data.

As discussed above, implementations of embodiments of the present invention enhance the user of fixed-type scanning devices by allowing visual operator feedback in the form of views of normally hidden surfaces of items being scanned. These views may be shown on some form of active display or may be displayed using a projector. The goal is to provide as much ease to the operator to aim optical codes or bar codes at a scanner. For example, a part or all of the scanning camera's field of view may be shown on a display adjacent or mounted to the scanner. A part or all of the scanning camera's field of view may be projected as an image on a suitable surface adjacent or upon the item being scanned. A part or all of the scanning camera's field of view may be projected on any of the surfaces of the work area surrounding the scanner. An additional camera or cameras may be employed to provide input images to any of the aforementioned display types in order to provide the most useful aiming information to the operator.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. An imaging scanner with enhanced usability and aiming, comprising:
   a scanning camera positioned that receives an image of an item reflected from a mirror, wherein the scanning camera partially shares a field of view with an operator's visual field of the mirror, and wherein the scanning camera and the operator see the mirror from a substantially same direction; and
   the mirror located where the operator locates and aims an item's data at the scanning camera, wherein the operator has a first line of sight to the item's data reflected in the mirror and the scanning camera has a second line of sight to the items' data reflected in the mirror, wherein the first line of sight and the second line of sight are in a substantially same direction.

2. The imaging scanner of claim 1, wherein the mirror is adjustable where the operator views a location on the scanned item.

3. The imaging scanner of claim 2, wherein the location and an angle of the scanning camera are fixed relative to the mirror, the mirror connected to a hinged base that allows the scanning camera and the mirror to adjust to the operator's preference.

4. The imaging scanner of claim 2, wherein a first line of sight of the operator is not coaxial with a second line of sight of the scanning camera.

5. The imaging scanner of claim 4, further comprising at least one illuminator positioned that provides pulses of light over the item to improve image contrast and aid exposure in the scanning camera.

6. The imaging scanner of claim 2, further comprising an aiming beam that originates from the scanning camera and reflects from the mirror onto the item's data, wherein the operator adjusts a position of the item having the aiming beam hit the item's data.

7. The imaging scanner of claim 6, wherein the aiming beam is substantially coaxial with an optical axis of the scanning camera.

8. The imaging scanner of claim 1, wherein the mirror has optical power that enhances the operator's view.

9. The imaging scanner of claim 8, wherein the mirror has several subsections at varying angles that enhances to enhance the operator's view.

10. An imaging scanner with enhanced usability and aiming, comprising:
    a scanning camera positioned that receives an image of a first item reflected from a mirror and the scanning camera positioned that receives an image of a second item transmitted through the mirror, wherein the mirror has a partially reflecting and partially transmitting coating;
    the scanning camera partially shares a field of view with an operator's visual field of the mirror, wherein the scanning camera sees a reflection in the mirror of the image of the first item positioned by the operator on a first side of the mirror, and sees the image of the second item through the mirror where the second item is positioned by a person on a second side of the mirror, and wherein the scanning camera and the operator see the mirror from a substantially same direction;
    the mirror located where the operator locates the first item's data and aims the first item's data at the scanning camera, wherein the operator has a first line of sight to the first item's data through the reflection in the mirror and the scanning camera has a second line of sight to the first item's data reflected in the mirror, wherein the first line of sight and the second line of sight are in a substantially same direction; and
    the mirror also located where the person positions the second item's data such that the scanning camera sees the second item's data through the mirror.

11. The imaging scanner of claim 10, further comprising an aiming beam that originates from the scanning camera and reflects from the mirror onto the first item's data, wherein the operator adjusts a position of the first item to have the aiming beam hit the first item's data.

12. The imaging scanner of claim 11, wherein the aiming beam is coaxial with an optical axis of the scanning camera.

13. The imaging scanner of claim 10, wherein the mirror is adjustable where the operator views a location on the scanned item.

14. The imaging scanner of claim 13, wherein a first line of sight of the operator is not coaxial with a second line of sight of the scanning camera.

15. The imaging scanner of claim 14, further comprising at least one first illuminator positioned in proximity to the first side of the mirror that provides pulses of light over the first item and improves image contrast and aid exposure in the scanning camera and at least one second illuminator positioned in proximity to the second side of the mirror that provides pulses of light over the second item and improves image contrast and aid exposure in the scanning camera.

16. The imaging scanner of claim 15, wherein the at least one first illuminator and the at least one second illuminator are alternately pulsed so the image of the first item and the image of the second item do not interfere with each other at the scanning camera.

17. The imaging scanner of claim 10, wherein the mirror has optical power that enhances the operator's view.

18. An imaging scanner with enhanced usability and aiming, comprising:

a scanning camera positioned that receives an image of a first item reflected from a mirror and that receives an image of a second item seen directly over the mirror;

the scanning camera partially shares a field of view with an operator's visual field of the mirror, wherein the scanning camera sees a reflection in the mirror of the image of the first item positioned by the operator on a first side of the mirror, and sees the image of a second item over the mirror where the second item is positioned by a person on a second side of the mirror; and the mirror located where the operator locates the first item's data and aims can aims the first item's data at the scanning camera, wherein the operator has a first line of sight to the first item's data through the reflection in the mirror, the scanning camera has a second line of sight to the first item's data, and the scanning camera has a third line of sight to the second item's data.

19. The imaging scanner of claim 18, further comprising an aiming beam that originates from the scanning camera and reflects from the mirror onto the first item's data, wherein the operator adjusts a position of the first item to have the aiming beam hit the first item's data.

20. The imaging scanner of claim 19, wherein the aiming beam is substantially coaxial with an optical axis of the scanning camera.

21. The imaging scanner of claim 20, further comprising a second aiming beam directed towards a surface enabling the person to position the second item for scanning.

22. The imaging scanner of claim 18, further comprising at least one first illuminator positioned in proximity to the first side of the mirror that provides pulses of light over the first item and improves image contrast and aid exposure in the scanning camera and at least one second illuminator positioned in proximity to the second side of the mirror that provides pulses of light over the second item and improves image contrast and aid exposure in the scanning camera.

23. The imaging scanner of claim 22, wherein the at least one first illuminator and the at least one second illuminator are alternately pulsed so the image of the first item and the image of the second item do not interfere with each other at the scanning camera.

* * * * *